Figure 1:
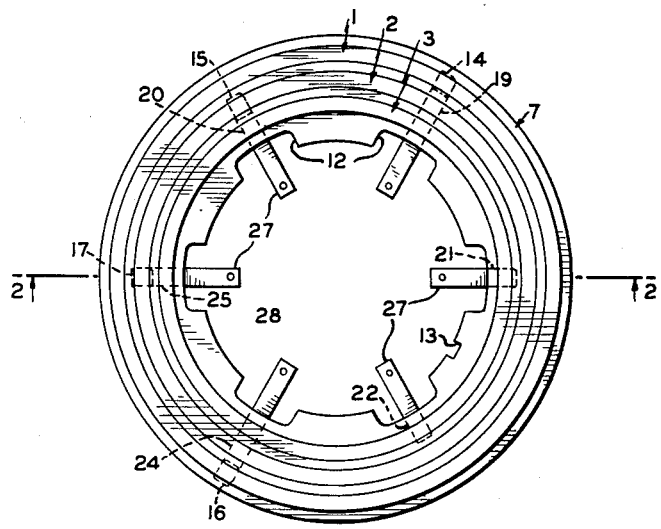

Feb. 23, 1960

N. E. BOILY ET AL 2,926,326

COLLECTOR RING ASSEMBLY

Filed March 5, 1957

3 Sheets-Sheet 1

INVENTORS
NORMAN E. BOILY
WILLARD F MASON

BY

ATTORNEYS

Feb. 23, 1960    N. E. BOILY ET AL    2,926,326
COLLECTOR RING ASSEMBLY

Filed March 5, 1957    3 Sheets-Sheet 2

INVENTORS
NORMAN E. BOILY
WILLARD F. MASON
BY
ATTORNEYS

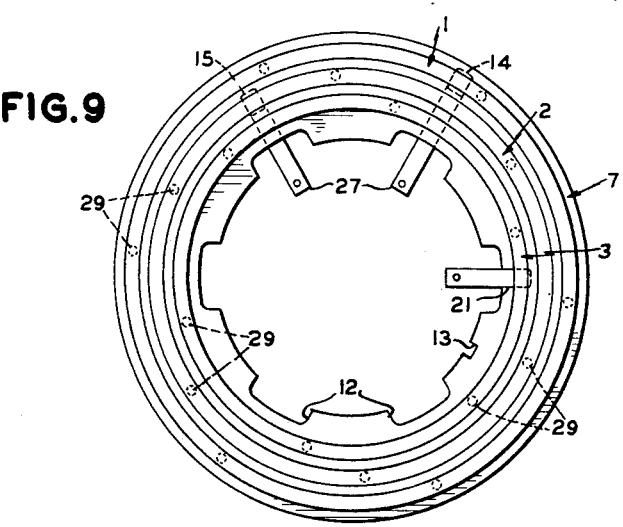
FIG. 9
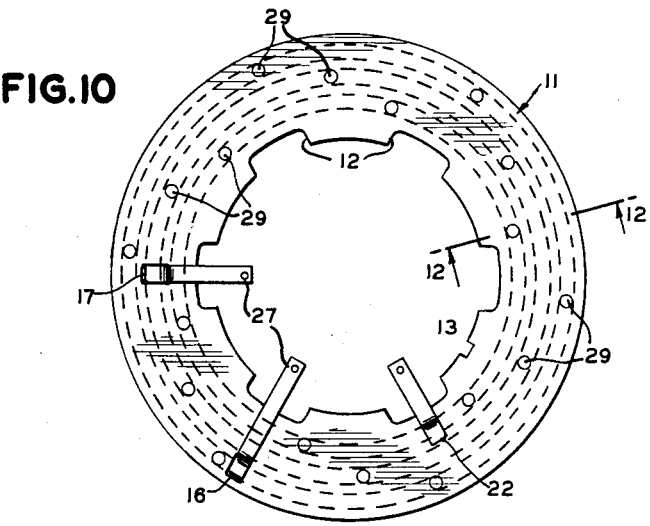
FIG. 10
FIG. 11
FIG. 12
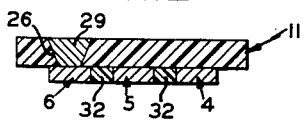
INVENTORS
NORMAN E. BOILY
WILLARD F. MASON United States Patent Office 2,926,326
Patented Feb. 23, 1960

2,926,326

COLLECTOR RING ASSEMBLY

Norman E. Boily, Barrington, R.I., and Willard F. Mason, Darien, Conn., assignors, by mesne assignments, to Engelhard Industries, Inc., a corporation of New Jersey Application March 5, 1957, Serial No. 644,042

3 Claims. (Cl. 339—8)

The present invention relates to a collector ring assembly and method of manufacture thereof and is concerned in particular with a concentric collector ring assembly of the type associated with a plurality of electrical brush elements.

In the production of concentric collector ring assemblies the electrically conductive rings are generally mounted on a non-conductive base and insulated from each other by an insulating material disposed between the adjacent rings.

There are several methods for producing the collector ring assemblies among which is the method of machining a plurality of individual conductive rings each dimensioned for spaced concentric positioning with respect to each other and then molded into a non-conductive material such as a non-conductive plastic material which forms a base for the ring assembly and simultaneously forms concentric insulating elements disposed between the spaced rings. With such method it is difficult to arrange the rings accurately concentrically and to keep them concentric during the molding operations. Also, plastics suitable for molding have a different coefficient of expansion than the metal rings and the finished plate assembly is subject to warping with temperature variations. The difficulty encountered is increased when thermosetting plastics are employed since the hard worked metal rings, e.g. silver rings, may be softened.

Another method involves the use of a laminated plastic mount, or a plastic containing filler material, which provides a rigid plate. The rigid plastic plate is machined to form concentric grooves therein in which grooves individual metal rings are concentrically inserted and secured, e.g. by cementing. With such method it is difficult to match the rings and grooves and to keep them accurately concentric. In a modification of the above mentioned method wherein the machined grooves of the plastic plate are filled with electo-deposited metal, e.g. silver, considerably more work is required and the laminated plastic, etc. is likely to become contaminated with the plating solution to the detriment of the electrical insulating properties of the plastic or other insulating material.

Figure 2:
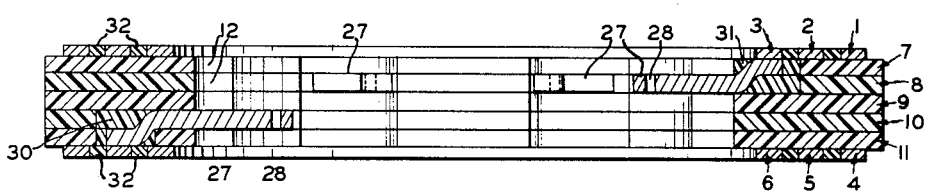
Figure 3:
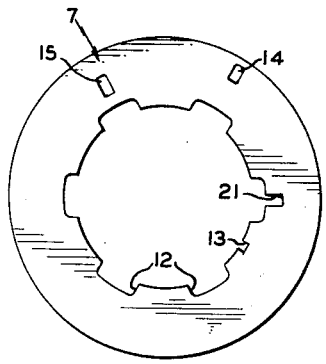
Figure 4:
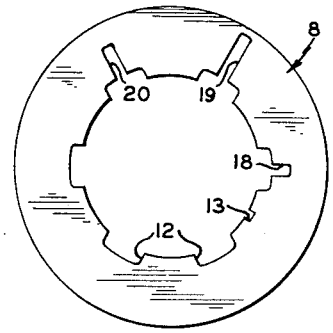
Figure 5:
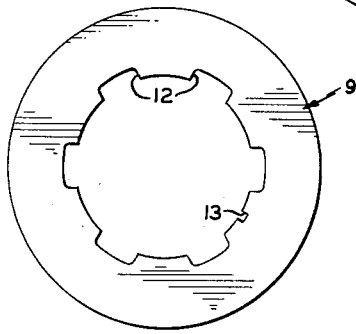
Figure 6:
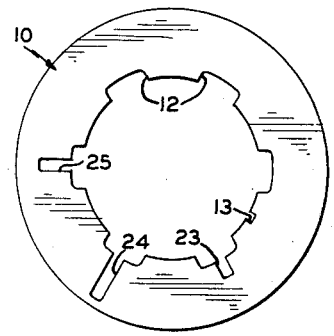
Figure 7:
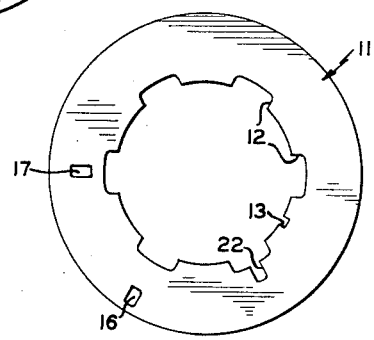
Figure 8:
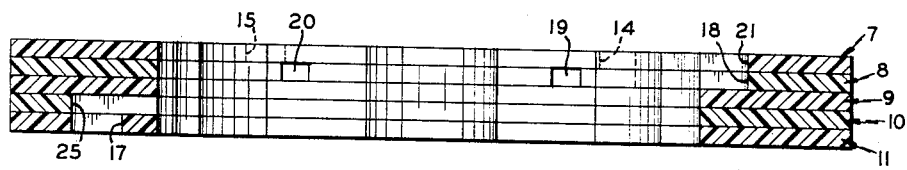

It is an object of the present invention to provide a collector ring assembly and method for the manufacture thereof which assures accurate concentricity of the rings and retains all the insulating properties of the insulating base and insulating members between the spaced adjacent rings. It is another object of the present invention to provide a collector ring assembly and method of manufacture thereof which precludes the disadvantages of conventional collector rings and which assures reliable electrical conducting properties. Other objects and advantages of the present invention will become apparent from the description hereinafter following and the drawings forming a part hereof, in which:

Figure 1 illustrates a plan view of a collector ring assembly according to the present invention, Figure 2 illustrates a cross-sectional view along lines 2—2 of Figure 1, Figures 3–7 illustrate plan views of individual insulating rings, Figure 8 illustrates a cross-sectional view of Figures 3–7 in laminated form, Figure 9 illustrates a plan view of an upper insulating ring with conductive concentric rings and ring tabs secured thereto, Figure 10 illustrates a bottom plan view of a lower insulating ring with conductive concentric rings and ring tabs secured thereto, Figure 11 illustrates a cross-sectional view of an individual ring-tab combination according to the invention, and Figure 12 illustrates a cross-sectional view along lines 12—12 of Figure 10.

According to the present invention there is provided a collector ring assembly comprising concentric conductive rings mounted on the top and bottom sides of a laminated plastic mount as illustrated by Figures 1 and 2, wherein the concentric conductive rings 1, 2 and 3 are mounted on a top side and conductive rings 4, 5 and 6 are mounted on the bottom side of an insulating mount comprising insulating plastic rings 7, 8, 9, 10 and 11 in laminated form.

The plastic mount is provided by stamping or otherwise forming individual rings 7, 8, 9, 10 and 11 from plastic sheet stock in the form of rings illustrated by Figures 3–7 wherein each of the rings are provided with a plurality of radially spaced locating recesses generally indicated by the numeral 12 on the inner edges of each ring and spaced approximately 60 degrees of each other. The particular spacing is associated with the number of concentric rings to be employed in the assembly and the angular spacing may be greater or lesser depending upon the number of conductive rings employed. A guide slot 13 may be cut or stamped into the inner edges of each insulating ring whereby vertical alignment of the slot 13 guides proper superposition of one ring upon another.

During the stamping or forming operation, certain insulator rings are provided with selectively located apertures 14, 15, 16 and 17 and slots 18, 19, 20, 21, 22, 23, 24 and 25, said slots and apertures being formed and dimensioned on a ring in accordance with the position of such ring in superposed relation to another. The apertures and slots are formed into each ring preferably along a radius bisecting the locating recesses 12 whereby equal angular spacing is provided in accordance with the number of locating recesses 12.

Figure 8 shows the position of each ring with respect to another prior to the cementing of the rings to provide for the laminated mount and prior to the incorporation of the conductive rings and associated leads.

Having provided the insulating rings illustrated by Figures 3–8, first and last rings or top and bottom rings 7 and 11 as illustrated by Figures 9, 10 and 12, are provided with spaced frusto-conical or beveled apertures 26 in a plurality of concentric rows corresponding with the location on the insulating rings on which the conductive rings 1, 2, 3, 4, 5 and 6 are placed. The beveled or frusto-conical apertures are so formed that the smaller openings thereof are adjacent the conductive rings.

The conductive rings, as illustrated by Figure 11, are each provided with elongated strips or tabs 27 having an aperture 28 formed through one end thereof for the connection of electrical leads thereto, and the other end of the tab is secured to the ring, as by weld, braze, solder or rivet, thereby forming a ring-tab unit with the tab extending toward the center of the ring. The tab is bent away from the ring at a location adjacent the ring and immediately thereafter in a direction toward the ring center with the major length of the tab being spaced from the plane of the ring surface.

With the provision of the conductive ring-tab units and the apertures 26 in the first and last insulating rings, the rings 1, 2 and 3 or rings 4, 5 and 6 are placed concentrically, as shown by Figures 9 and 10, on the surface of the ring 7 and 11 with each ring covering its respective circular row of apertures 26.

For example, the tab 27 of ring 1 is inserted into the aperture 14 of ring 7 until the ring 1 is seated on the insulating ring 7. Ring 2 is similarly seated, and the tab 27 of ring 3 is fitted into slot 21, thereby seating said ring 3. Thereafter, the ring is reversed or turned over, and the beveled or frusto-conical apertures are filled with solder thereby soldering the conductive rings 1, 2, 3, 4, 5 and 6 to the insulating rings 7 or 11, as particularly illustrated by Figure 12 showing the solid solder-rivet 29 in the form of a frustum securing the conductive ring 6. After soldering as above described the under surface of the rings 7 and 11 are finished to provide smooth surfaces for mating with rings 8 and 10.

Having thus soldered the conductive rings to the insulating rings 7 and 11, the next ring 8 is placed in mating position with ring 7, whereby the tabs 27 of rings 1, 2 and 3 engage the slots 18, 19 and 20. Insulating rings 10 and 11 are similarly mated and middle ring 9 is placed between rings 8 and 10 and aligned therewith.

Thereafter, the rings are cemented together with a suitable plastic resin which fills the interstices and spacings between the rings including the remaining spaces in the apertures and slots. The resin cementing is particularly shown by Figure 2 which shows filling of the interstices by the plastic cement as at 30 and 31.

Having thus cemented the rings into a laminated mount, the plastic resin is further applied between the concentric conductive rings and thereby filling such spaces as at 32 and permitting the resin to flow under and around the edges of the conductive rings to act cooperatively with the solder rivets to secure the rings to the insulating lamina.

The final operation is the machining of the surfaces of the assembly to remove excess cement and to complete the assembly to final dimensions and surface finish.

The invention is not intended to be limited to the specific illustrations, and other modifications are contemplated within the scope of the appended claims.

What we claim is:

1. A collector ring assembly comprising a plurality of flat insulating rings in the form of a flat cemented laminated structure, a plurality of spaced concentric conductive rings secured to the flat surface of at least one outer insulating ring, said conductive rings being secured to said outer insulating ring by means of a solder member in the form of a frustum positioned in an aperture in said insulating ring and having its smaller surface joined to said conductive ring.

2. A collector ring assembly according to claim 1, comprising an electrically conductive means secured to each of said rings, passages in said laminated rings receptive to said conductive means, and a cement filling said passages and the spaces between said concentric rings.

3. A collector ring assembly according to claim 2, comprising spaced concentric conductive rings secured to the surfaces of the outer insulating rings.

References Cited in the file of this patent

UNITED STATES PATENTS

| | | |
|---|---|---|
| 1,347,970 | Overstreet | July 27, 1920 |
| 1,493,859 | Himes | May 13, 1924 |
| 2,471,808 | Baker | May 31, 1949 |
| 2,481,951 | Sabee et al. | Sept. 13, 1949 |
| 2,502,291 | Taylor | Mar. 28, 1950 |
| 2,547,022 | Leno | Apr. 3, 1951 |
| 2,669,483 | Fletcher | Feb. 16, 1954 |
| 2,696,570 | Pandapas | Dec. 7, 1954 |